United States Patent
Wu et al.

(10) Patent No.: US 12,411,487 B2
(45) Date of Patent: Sep. 9, 2025

(54) MOVABLE PLATFORM CONTROL METHOD AND DEVICE, MOVABLE PLATFORM AND STORAGE MEDIUM

(71) Applicant: SZ DJI TECHNOLOGY CO., LTD., Shenzhen (CN)

(72) Inventors: Qifeng Wu, Shenzhen (CN); Jie Qian, Shenzhen (CN); Yaotian Cui, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 337 days.

(21) Appl. No.: 17/945,155

(22) Filed: Sep. 15, 2022

(65) Prior Publication Data
US 2023/0018021 A1    Jan. 19, 2023

Related U.S. Application Data

(63) Continuation of application No. PCT/CN2020/082381, filed on Mar. 31, 2020.

(51) Int. Cl.
*G05D 1/00* (2024.01)
*B64C 39/02* (2023.01)
(Continued)

(52) U.S. Cl.
CPC ......... *G05D 1/0016* (2013.01); *G05D 1/0094* (2013.01); *G05D 1/101* (2013.01);
(Continued)

(58) Field of Classification Search
CPC .... G05D 1/0016; G05D 1/0094; G05D 1/101; G05D 1/102; G05D 1/0038;
(Continued)

(56) References Cited

U.S. PATENT DOCUMENTS

| 2015/0205301 A1* | 7/2015 | Gilmore | G05D 1/0094 701/11 |
| 2017/0153640 A1* | 6/2017 | Maekawa | B64U 10/00 |

(Continued)

FOREIGN PATENT DOCUMENTS

| CN | 104898699 A | 9/2015 |
| CN | 105676865 A | 6/2016 |

(Continued)

OTHER PUBLICATIONS

Machine Translation WO-2018098784-A1 (Year: 2018).*
(Continued)

*Primary Examiner* — Anne Marie Antonucci
*Assistant Examiner* — Wesam Almadhrhi
(74) *Attorney, Agent, or Firm* — ANOVA LAW GROUP, PLLC

(57) ABSTRACT

A control method and device of a movable platform, a movable platform, and a storage medium are provided. The control method may include acquiring a control amount for controlling the movable platform; converting the control amount into control instruction of the movable platform based upon a position of the movable platform and a position of a target object photographed by the movable platform; and controlling the movable platform to move relative to the target object according to the control instruction.

20 Claims, 9 Drawing Sheets

(51) Int. Cl.
    *B64U 10/14*     (2023.01)
    *B64U 101/30*    (2023.01)

(52) U.S. Cl.
    CPC ............ *B64C 39/024* (2013.01); *B64U 10/14* (2023.01); *B64U 2101/30* (2023.01); *B64U 2201/20* (2023.01)

(58) Field of Classification Search
    CPC .. B64C 39/024; B64U 10/14; B64U 2101/30; B64U 2201/20
    See application file for complete search history.

(56) References Cited

U.S. PATENT DOCUMENTS

2017/0269594 A1   9/2017   Sydnor
2018/0114058 A1   4/2018   Kahn
2019/0011921 A1*  1/2019   Wang .................... G06T 7/246
2019/0196513 A1   6/2019   Zhou et al.

FOREIGN PATENT DOCUMENTS

| CN | 106909172 A | 6/2017 | |
|----|----|----|----|
| CN | 107000839 A | 8/2017 | |
| CN | 108780316 A | 11/2018 | |
| CN | 109196441 A | 1/2019 | |
| CN | 110892714 A | 3/2020 | |
| WO | WO-2018098784 A1 * | 6/2018 | ........... B64C 39/024 |

OTHER PUBLICATIONS

International Search Report and Written Opinion mailed on Jan. 6, 2021, received for PCT Application PCT/CN2020/082381, filed on Mar. 31, 2020, 8 pages including English Translation.

* cited by examiner

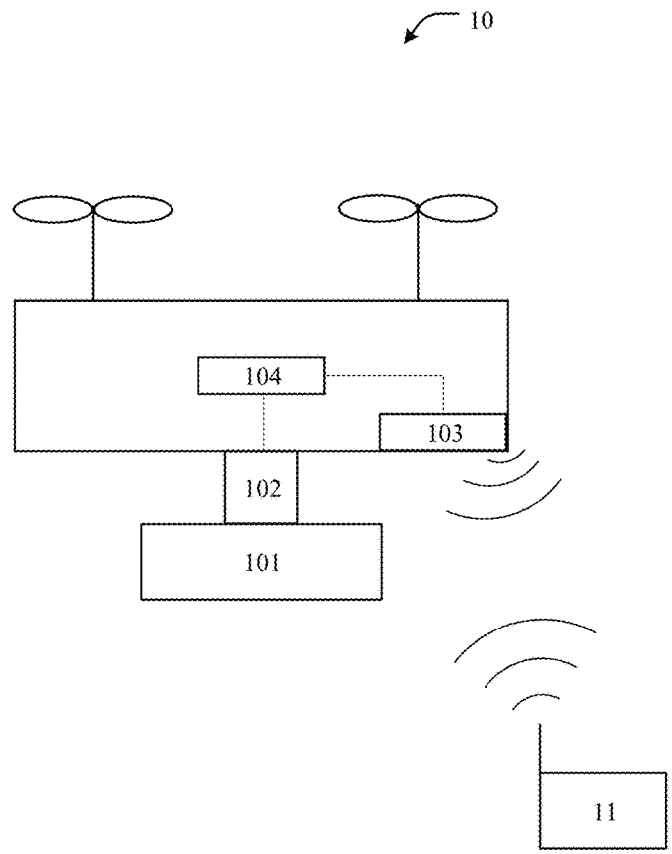

FIG. 3

| Acquire a control amount used to control a movable platform, where the control amount is generated based upon an operation of a user on a control device | S401 |

| Convert the control amount into a control instruction of the movable platform based upon a position of the movable platform and a position of a target object photographed by the movable platform | S402 |

| Control the movable platform to move relative to the target object according to the control instruction | S403 |

FIG. 4

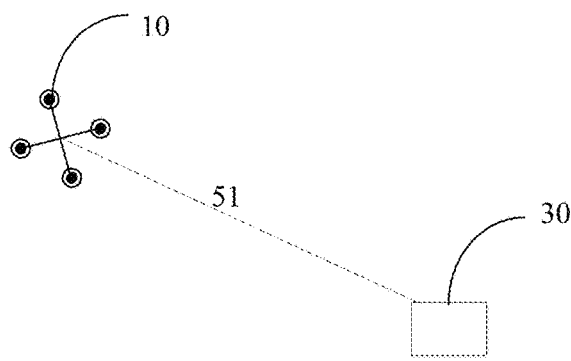

FIG. 7

```
┌─────────────────────────────────────────────────────────────────┐
│  Establish a coordinate system based upon a position of the movable  │─── S801
│         platform and a position of the target object             │
└─────────────────────────────────────────────────────────────────┘
                              │
                              ▼
┌─────────────────────────────────────────────────────────────────┐
│  Map the control amount to the coordinate system to convert the control │─── S802
│      amount into a control instruction of the movable platform   │
└─────────────────────────────────────────────────────────────────┘
```

FIG. 8

MOVABLE PLATFORM CONTROL METHOD AND DEVICE, MOVABLE PLATFORM AND STORAGE MEDIUM

CROSS REFERENCE TO RELATED APPLICATION

The present application is a continuation of International Application No. PCT/CN2020/082381, filed Mar. 31, 2020, the entire contents of which being incorporated herein by reference in its entirety.

TECHNICAL FIELD

The present disclosure relates to the field of control, and particularly relates to a movable platform control method, a movable platform control device, a movable platform, and a storage medium.

BACKGROUND

In the existing technology, a user may control a movable platform such as an unmanned aerial vehicle through a control device, and the control device may be, for example, a remote control, a smart phone, a tablet computer, or other devices. Specifically, the user may operate the joystick on the remote control or the virtual joystick on the user interaction interface to control the unmanned aerial vehicle.

SUMMARY

The present disclosure provides a control method and control device for controlling a movable platform, a movable platform, and a storage medium, which reduces the difficulty of controlling a movable platform by a user through a control device.

A first aspect of the present disclosure provides a control method for controlling a movable platform. The movable platform is communicatively connected with a control device of the movable platform, and the control method may include:

acquiring a control amount for controlling the movable platform, the control amount being generated based upon an operation of a user on the control device;

converting the control amount into control instruction of the movable platform based upon a position of the movable platform and a position of a target object photographed by the movable platform; and controlling the movable platform to move relative to the target object according to the control instruction.

A second aspect of the present disclosure provides a control device for a movable platform. The movable platform is communicatively connected with a control device of the movable platform, and the control device may include circuitry configured to:

acquire a control amount for controlling the movable platform, the control amount being generated based upon an operation of a user on the control device;

convert the control amount into control instruction of the movable platform based upon a position of the movable platform and a position of a target object photographed by the movable platform; and control the movable platform to move relative to the target object according to the control instruction.

A third aspect of the present disclosure provides a movable platform. The movable platform may include:

a body;

a power system, mounted on the body and configured to provide power for movement; and the control device according to the second aspect of the present disclosure.

A fourth aspect of the present disclosure provides a non-transitory computer readable storage medium having a computer program stored thereon, the computer program being executed by a processor to implement the control method according to the first aspect of the present disclosure.

The control method and control device of the movable platform, movable platform, and storage medium provided in some embodiments of the present disclosure may acquire the control amount for controlling the movable platform and convert the control amount into the control instruction of the movable platform based upon the position of the movable platform and the position of the target object photographed by the movable platform. Compared with the existing technology, in which control amount is based on the forward direction of the body of the movable platform or a certain fixed direction as a reference, taking the positions of the movable platform and the target object as a reference allows the user to more intuitively feel the relationship between the operation of the control device and the composition, so that the user knows how to control the control device to take a better picture, especially when the target object is in motion, it greatly reduces the difficulty of controlling the movable platform by the user through the control device.

It should be understood that the above general description and the following detailed description are only exemplary and explanatory and are not restrictive of the present disclosure.

BRIEF DESCRIPTION OF THE DRAWINGS

In order to explain the technical features of embodiments of the present disclosure more clearly, the drawings used in the present disclosure are briefly introduced as follow. Obviously, the drawings in the following description are some exemplary embodiments of the present disclosure. Ordinary person skilled in the art may obtain other drawings and features based on these disclosed drawings without inventive efforts.

FIG. 3 illustrates a schematic diagram of an application scenario according to some embodiments of the present disclosure.

FIG. 4 illustrates a flowchart of a movable platform control method according to some embodiments of the present disclosure.

FIG. 7 illustrates a schematic diagram of a connecting line between an unmanned aerial vehicle and a target object according to some embodiments of the present disclosure.

FIG. 8 illustrates a flowchart of a movable platform control method according to some embodiments of the present disclosure.

DETAILED DESCRIPTION

Figure 1:
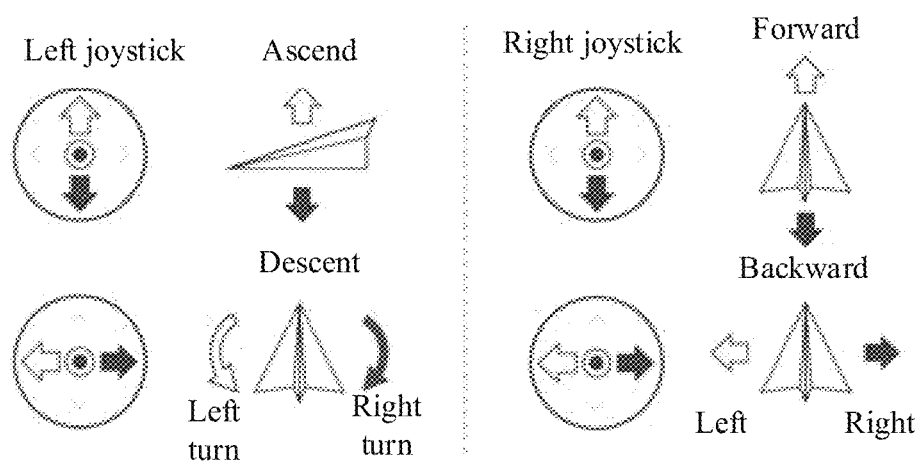
FIG. 1 illustrates a schematic diagram of a corresponding relationship bet a control mode of an unmanned aerial vehicle and a joystick provided in the related art.

The technical solutions and technical features encompassed in the exemplary embodiments of the present disclosure will be described in detail in conjunction with the accompanying drawings in the exemplary embodiments of the present disclosure. Apparently, the described exemplary embodiments are part of embodiments of the present disclosure, not all of the embodiments. Based on the embodiments and examples disclosed in the present disclosure, all other embodiments obtained by those of ordinary skill in the art without inventive efforts shall fall within the protection scope of the present disclosure.

Here, exemplary embodiments will be described in detail, and examples thereof are shown in the accompanying drawings. The implementation manners described in the following exemplary embodiments do not represent all implementation manners consistent with the present disclosure. On the contrary, they are only examples of devices and methods consistent with some aspects of the disclosure as detailed in the appended claims. Further, the chart(s) and diagram(s) shown in the drawings are only examples, and does not necessarily include all components, elements, contents and/or operations/steps, nor does it have to be arranged in the described or specific order. For example, certain steps of the method may be performed in other orders or at the same time; some components/elements can also be disassembled, combined, or partially combined; therefore, the actual arrangement may be changed or modified according to actual conditions. In the case of no conflict, the components, elements, operations/steps, and other features disclosed in various embodiments may be combined with each other.

Currently, the control of the unmanned aerial vehicle is based on the nose direction of the unmanned aerial vehicle or a certain fixed direction. When the unmanned aerial vehicle is equipped with a photographing device and needs to use the photographing device to shoot a target object, it is difficult for the user to judge how to control the joystick to take a better picture. Especially for a moving target object such as a person, a vehicle, a boat, etc., it even more greatly increases the control difficulty of the user.

In the related art, a user can control a movable platform such as an unmanned aerial vehicle through a control device. Specifically, the user can operate the joystick on the remote control or the virtual joystick on the user interaction interface to control the unmanned aerial vehicle. For example, the remote control may be provided with a left joystick and a right joystick, and the corresponding relationship between the way the user uses the left joystick and the right joystick and the movement mode of the unmanned aerial vehicle may be shown in FIG. 1. When the user pushes the left joystick upwards, the unmanned aerial vehicle ascends. When the user pushes the left joystick downwards, the unmanned aerial vehicle descends. When the user pushes the left joystick to the left, the unmanned aerial vehicle turns left. When the user pushes the left joystick to the right, the unmanned aerial vehicle turns right. When the user pushes the right joystick upwards, the unmanned aerial vehicle flies forward. When the user pushes the right joystick downwards, the unmanned aerial vehicle flies backward. When the user pushes the right joystick to the left, the unmanned aerial vehicle translates to the left. When the user pushes the right joystick to the right, the unmanned aerial vehicle translates to the right.

Figure 2:
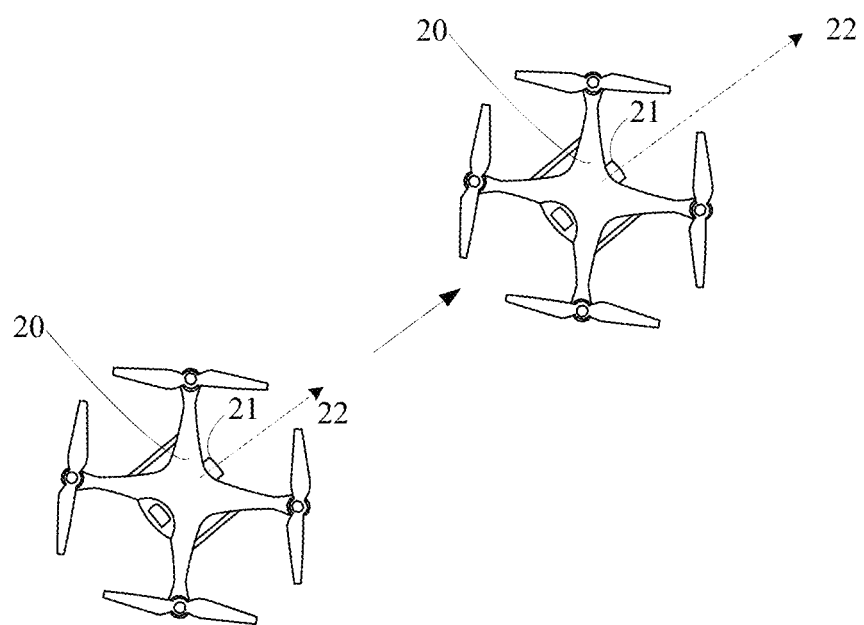
FIG. 2 illustrates a schematic diagram of a nose direction provided by the related art.

However, at present, the control of the unmanned aerial vehicle is based on the nose direction of the unmanned aerial vehicle or a certain fixed direction. As shown in FIG. 2, 21 denotes the nose of the unmanned aerial vehicle 20, and 22 represents the nose direction of the unmanned aerial vehicle 20. When the user pushes the right joystick as shown in FIG. 1 upwards, the unmanned aerial vehicle flies forward with the nose direction 22 as a reference. For example, as shown in FIG. 2, the unmanned aerial vehicle flies forward along the nose direction 22. Optionally, when the user pushes the right joystick as shown in FIG. 1 upwards, the unmanned aerial vehicle flies forward based on a certain fixed direction as a reference, which may be, for example, a north direction. In other words, when the user pushes the right joystick upwards as shown in FIG. 1, the unmanned aerial vehicle flies forward in the northward direction.

When the unmanned aerial vehicle is equipped with a photographing device and needs to use the photographing device to shoot a target object, if the control of the unmanned aerial vehicle is based on the nose direction or a fixed direction, it may be difficult for the user to judge how to control the joystick to take a better picture. Especially for a moving target object such as a person, a vehicle, a boat, etc., it greatly increases the user's control difficulty.

To address the foregoing problems, the present disclosure provides a control method for controlling a movable platform, a control device for a movable platform, a movable platform, and a storage medium for controlling a movable platform. Hereinafter, some embodiments of the present disclosure will be described in detail with reference to the accompanying drawings.

The present disclosure firstly provides a control method for controlling a movable platform. The movable platform may be a movable device such as an unmanned aerial vehicle, a movable robot, etc. The following is a schematic description using an unmanned aerial vehicle as an example. As shown in FIG. 3, in one embodiment, the unmanned aerial vehicle 10 is equipped with a photographing device 101. In some embodiments, the photographing device 101 is mounted on the body of the unmanned aerial vehicle 10 through a supporting device 102, and the supporting device 102 may be a gimbal. The photographing device 101 is used to capture images or record videos during the movement of the unmanned aerial vehicle. In addition, a user may control the flight of the unmanned aerial vehicle through a control device 11 on the ground. The control device 11 may be a remote control (for example, a remote control with a screen), a mobile phone, a tablet computer, a notebook computer, or other devices corresponding to the unmanned aerial vehicle. Herein takes the remote control as an example for schematic description, specifically, the remote control may be provided with an operating element, such as a joystick, a trackball, a dial wheel, a throttle quadrant, a steering wheel, etc., for the user to operate, and a joystick will be used as an example for schematic description in the present disclosure.

The remote control may generate a control amount based upon an operation of the joystick by the user. Further, the remote control sends the control amount to the unmanned aerial vehicle 10 through wireless communication. For example, the unmanned aerial vehicle 10 is provided with a communication module 103 and a flight controller 104. After receiving the control amount from the remote control through the communication module 103, the flight controller 104 generates a control instruction based upon the control amount to control the flight of the unmanned aerial vehicle. In some other embodiments, the remote control may generate a control instruction based upon the control amount and send the control instruction to the unmanned aerial vehicle 10, so that the flight controller 104 may control the unmanned aerial vehicle according to the control instruction.

It is understandable that the operating element provided on the remote control for the user to operate is not limited to the joystick. For example, it may also be an icon, or a virtual key displayed on the remote control screen, or the operating element may also be a physical key or button provided on the body of the remote control. In some embodiments of the present disclosure, the control method may be executed on the movable platform; in other embodiments, the control method may be executed on the control device of the movable platform. The following takes the execution on the movable platform as an example for description.

FIG. 4 illustrates a flowchart of a control method for controlling a movable platform according to some embodiments of the present disclosure. The movable platform is in communication connection with a control device of the movable platform, and the movable platform is specifically taking an unmanned aerial vehicle as an example. As shown in FIG. 3, the unmanned aerial vehicle 10 and the control device 11 are in communication connection. As shown in FIG. 4, the control method for controlling a movable platform may include steps S401-S403.

In step S401, a control amount used to control the movable platform is acquired, where the control amount is generated based upon an operation of a user on the control device.

The user may operate the control device 11. For example, the operation may include an operation of a joystick, a dial wheel, or a key of the control device. In some embodiments, the control device 11 is a remote control, and the remote control is provided with a joystick, a dial wheel, or a key. Among them, the joystick may be used to control the unmanned aerial vehicle, and the dial wheel may be used to control a gimbal mounted on the unmanned aerial vehicle. The key may be a virtual key displayed on a screen of the remote control, or the key may also be a physical key or button provided on the body of the remote control. When the user operates the joystick, dial wheel or key on the remote control, the remote control may generate a control amount based upon the operation. For example, the control amount is a control amount used to control an unmanned aerial vehicle. Further, the remote control may send the control amount to the unmanned aerial vehicle 10.

In some embodiments, the control method may further include determining a target object according to a click operation, a frame selection operation, or a position input operation of a user on a user interface of the control device.

Figure 5:
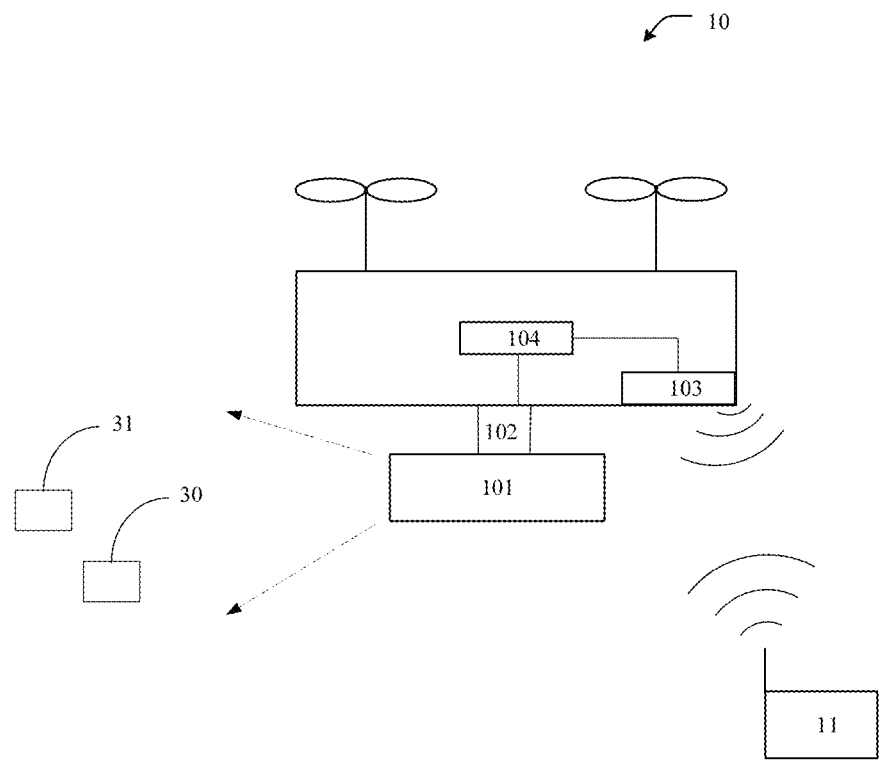
FIG. 5 illustrates a schematic diagram of an unmanned aerial vehicle and a target object according to some embodiments of the present disclosure.
Figure 6:
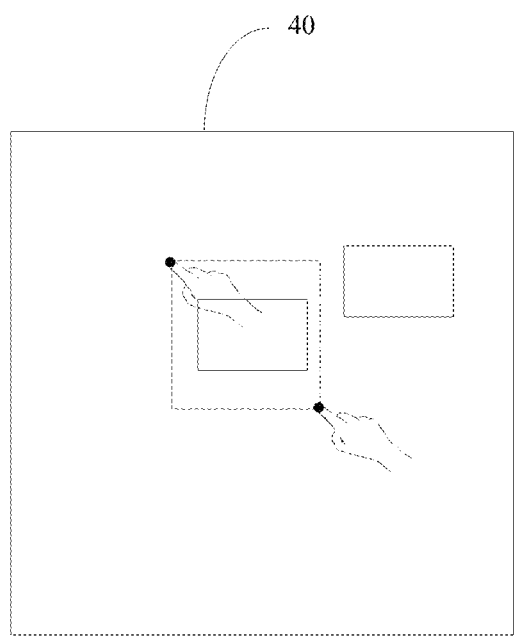
FIG. 6 illustrates a schematic diagram of a user interface for selecting a target object according to some embodiments of the present disclosure.

FIG. 5 illustrates a schematic diagram of an unmanned aerial vehicle and a target object according to some embodiments of the present disclosure; and FIG. 6 illustrates a schematic diagram of a user interface for selecting a target object according to some embodiments of the present disclosure. As shown in FIG. 5, a target object 30 and an object 31 are within the shooting range of the photographing device 101, the unmanned aerial vehicle 10 may send an image collected by the photographing device 101 to the control device 11 through the communication module 103, and the control device 11 displays the image on a user interface of the control device 11. As shown in FIG. 6, 40 represents an image displayed on the user interface of the control device 11. The image 40 includes an image area corresponding to the target object 30 and the object 31. Further, the user may perform a click operation and/or a frame selection operation on the user interface, so as to determine the target object photographed by the unmanned aerial vehicle 10. Taking the frame selection operation as an example, the user may start sliding from the upper left corner of the image area corresponding to the target object 30 to the lower right corner of the image area, and the control device 11 determines the target object selected by the user as the target object 30 according to the frame selection operation of the user. Further, the control device 11 determines the position information of the target object 30 in the image, so that the unmanned aerial vehicle may determine the position information of the target object 30 in the three-dimensional space based upon the position information of the target object 30 in the image.

In certain embodiments, the user may also perform a position input operation on the user interface of the control device, and the position input operation can directly input position information of the target object in the three-dimensional space.

In step S402, the control amount is converted into a control instruction of the movable platform based upon a position of the movable platform and a position of a target object photographed by the movable platform.

In some embodiments, after the unmanned aerial vehicle 10 receives the control amount sent by the control device 11, the flight controller 104 may convert the control amount into a control instruction of the unmanned aerial vehicle 10 based upon a position of the unmanned aerial vehicle 10 and a position of the target object photographed by the unmanned aerial vehicle.

In some other embodiments, after the remote control generates the control amount based upon the operation of the user on the control device 11, the remote control may convert the control amount into a control instruction of the unmanned aerial vehicle 10 based upon a position of the unmanned aerial vehicle and a position of the target object photographed by the unmanned aerial vehicle. Further, the remote control may send the control instruction to the unmanned aerial vehicle 10, wherein the position of the unmanned aerial vehicle and the position of the target object photographed by the unmanned aerial vehicle may be sent by the unmanned aerial vehicle 10 to the remote control.

In step S403, the movable platform is controlled to move relative to the target object according to the control instruction.

In some embodiments, the control instruction of the unmanned aerial vehicle converted from the control amount may be used to control the unmanned aerial vehicle to move relative to the target object. Optionally, the unmanned aerial vehicle moves relative to the target object by taking the connecting line between the unmanned aerial vehicle and the target object as a reference. As shown in FIG. 7, the dashed line 51 represents a connecting line between the unmanned aerial vehicle 10 and the target object 30, and the flight controller 104 may control the unmanned aerial vehicle 10 to move relative to the target object 30 with the connecting line between the unmanned aerial vehicle 10 and the target object 30 as a reference according to the control instruction.

The control method described above acquires the control amount used to control the movable platform and converts the control amount into the control instruction of the movable platform based upon the position of the movable platform and the position of the target object photographed by the movable platform, where the control instruction can control the movable platform to move relative to the target object by taking the connecting line between the movable platform and the target object as a reference. Compared with the existing technology, where control amount is based on the forward direction of the body of the movable platform or a certain fixed direction as a reference, taking the connecting line between the movable platform and the target object as the reference allows the user to more intuitively feel the relationship between the operation of the control device and the composition, thereby saving the user the time and effort to control the target object at the pre-set position in the image. It makes the user know how to control the control device to take a better picture, especially when the target object is in motion, which greatly reduces the difficulty of controlling the movable platform by the user through the control device.

One embodiment of the present disclosure further provides a control method for controlling a movable platform. FIG. 8 illustrates a flowchart of a movable platform control method according to some embodiments of the present disclosure. As shown in FIG. 8, on the basis of the foregoing embodiments, the conversion of the control amount into a control instruction of the movable platform based upon the position of the movable platform and the position of the target object photographed by the movable platform may include step S801 and step S802.

Step S801 may include establishing a coordinate system based upon the position of the movable platform and the position of the target object.

In some embodiments, the flight controller 104 may establish a coordinate system based upon a position of the unmanned aerial vehicle and a position of the target object photographed by the unmanned aerial vehicle.

In certain embodiments, the coordinate system is a polar coordinate system, the pole of the polar coordinate system is determined according to the position of the movable platform, and the polar axis direction of the polar coordinate system is a connecting line direction of the movable platform and the target object. In one embodiment, the connecting line between the movable platform and the target object is a connecting line between the movable platform and the target object in a horizontal direction. In another embodiment, the connecting line between the movable platform and the target object is a connecting line between a center point of the movable platform and a center point of the target object.

Figure 9:
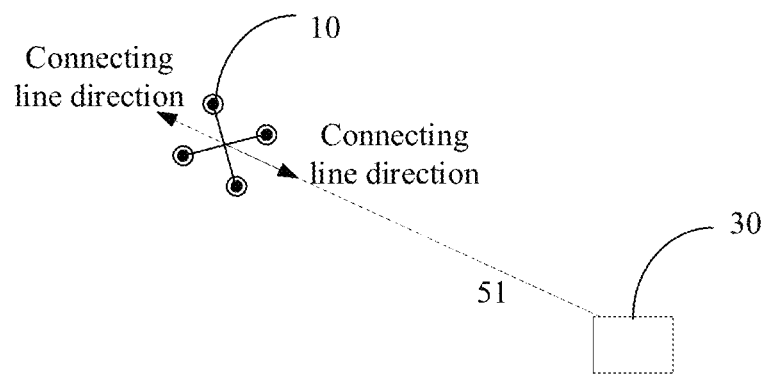
FIG. 9 illustrates a schematic diagram of a connecting line direction of an unmanned aerial vehicle and a target object according to some embodiments of the present disclosure.

The flight controller 104 may establish a polar coordinate system based upon the position of the unmanned aerial vehicle 10 and the position of the target object 30 photographed by the unmanned aerial vehicle. As shown in FIG. 9, the pole of the polar coordinate system may be determined according to the position of the unmanned aerial vehicle 10. For example, the pole of the polar coordinate system may be the current position of the unmanned aerial vehicle 10. Alternatively, the pole of the polar coordinate system may be a point within a preset range around the current position of the unmanned aerial vehicle 10. The polar axis direction of the polar coordinate system is the connecting line direction of the unmanned aerial vehicle 10 and the target object 30. As shown in FIG. 9, the connecting line direction may be directed from the unmanned aerial vehicle 10 to the target object 30, or from the target object 30 to the unmanned aerial vehicle 10. Herein, the unmanned aerial vehicle 10 pointing to the target object 30 is taken as an example of the connecting line direction for schematic illustration.

Figure 10:
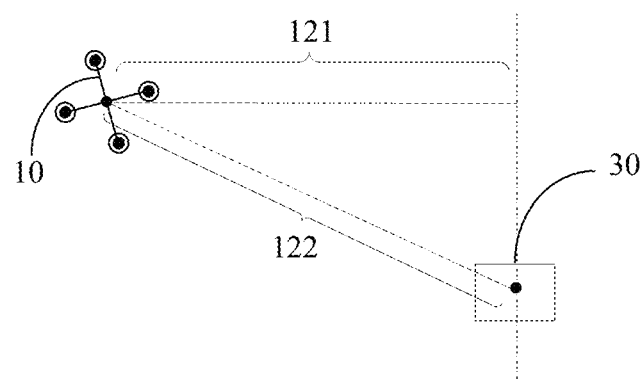
FIG. 10 illustrates a schematic diagram of a connecting line between an unmanned aerial vehicle and a target object according to some embodiments of the present disclosure.

In some embodiments, the unmanned aerial vehicle 10 and the target object 30 may be on the same horizontal plane, or may not be on the same horizontal plane, as shown in FIG. 10. Therefore, the connecting line between the unmanned aerial vehicle 10 and the target object 30 may be a connecting line 121 between the unmanned aerial vehicle 10 and the target object 30 in a horizontal direction or may be a connecting line 122 between a center point of the unmanned aerial vehicle 10 and a center point of the target object 30.

Step S802 may include mapping the control amount to the coordinate system to convert the control amount into a control instruction of the movable platform.

In the present disclosure, there are several possible implementations for mapping a control amount to a polar coordinate system to convert the control amount into a control instruction of an unmanned aerial vehicle.

In some embodiments, the control amount is mapped to a preset coordinate system, and then based upon the transformation relationship between the preset coordinate system and the polar coordinate system, the control amount from the preset coordinate system is mapped to the polar coordinate system to convert the control amount into a control instruction of the unmanned aerial vehicle, so that the flight controller 104 may control the unmanned aerial vehicle to move relative to the target object by taking the connecting line between the unmanned aerial vehicle and the target object as a reference according to the control instruction. The preset coordinate system may be a body coordinate system of the unmanned aerial vehicle, a world coordinate system, or a geodetic coordinate system.

In other embodiments, the control amount is directly mapped to the polar coordinate system to convert the control amount into a control instruction of the unmanned aerial vehicle. For example, when the user pushes the right joystick as shown in FIG. 1 upwards, the remote control or flight controller 104 may convert the corresponding control amount into a control instruction based upon the connecting line between the unmanned aerial vehicle and the target object. Thus, the flight controller 104 may control the unmanned aerial vehicle to fly forward along the connecting line between the unmanned aerial vehicle and the target object according to the control instruction, that is, to approach the target object.

In the embodiments described above, the polar coordinate system is established by the position of the movable platform and the position of the target object, and the control instruction converted by the control amount based upon the polar coordinate system can be used to control the unmanned aerial vehicle to move relative to the target object by taking the connecting line of the unmanned aerial vehicle and the target object as a reference, so that the user may more intuitively feel the relationship between the operation of the user on the control device and the composition, thereby saving the user time and effort to control the target object at the preset position in the image. It makes the user know how to control the control device to take a better picture, especially when the target object is in motion, which greatly reduces the difficulty of controlling the movable platform by the user through the control device.

In some embodiments, the controlling the movable platform to move relative to the target object may include controlling the movable platform to move away from or approach the target object along a connecting line between the movable platform and the target object.

As shown in FIG. 7, a dashed line 51 represents a connecting line between the unmanned aerial vehicle 10 and the target object 30. In the embodiments of the present disclosure, the flight controller 104 may control the unmanned aerial vehicle 10 to move away from or approach the target object 30 along the connecting line of the unmanned aerial vehicle 10 and the target object 30. For example, when the user pushes the right joystick as shown in FIG. 1 upwards or downwards, the control device 11 may generate a control amount. Further, the control device 11 may send the control amount to the unmanned aerial vehicle 10, and the flight controller 104 maps the control amount into the polar coordinate system as described above to convert the control amount into a control instruction of the unmanned aerial vehicle. Further, the flight controller 104 controls the unmanned aerial vehicle 10 to move away from or close to the target object 30 along the connecting line of the unmanned aerial vehicle 10 and the target object 30 according to the control instruction. Optionally, when the user pushes the right joystick as shown in FIG. 1 upwards, the unmanned aerial vehicle 10 approaches the target object 30 along the connecting line of the unmanned aerial vehicle 10 and the target object 30; when the user pushes the right joystick as shown in FIG. 1 downwards, the unmanned aerial vehicle 10 moves away from the target object 30 along the connecting line of the unmanned aerial vehicle 10 and the target object 30. That is, when the user pushes the right joystick as shown in FIG. 1 upwards or downwards, the unmanned aerial vehicle 10 can be controlled to move away from or approach the target object 30 along the connecting line of the unmanned aerial vehicle 10 and the target object 30.

In other embodiments, the control device 11 may map the control amount to the polar coordinate system as described above to convert the control amount into a control command of the unmanned aerial vehicle. Then, the control device 11 sends the control instruction to the unmanned aerial vehicle 10, so that the flight controller 104 controls the unmanned aerial vehicle 10 to move away from or approach the target object 30 along a connecting line between the unmanned aerial vehicle 10 and the target object 30 according to the control instruction.

Figure 11:
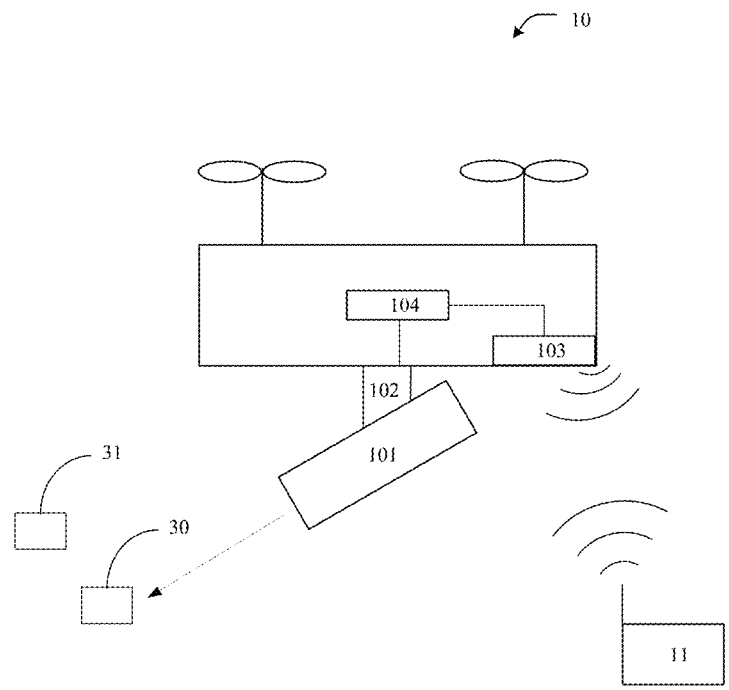
FIG. 11 illustrates a schematic diagram of adjusting a photographing device to a direction toward a target object according to some embodiments of the present disclosure.

Understandably, during the process of the unmanned aerial vehicle 10 moving away from or approaching the target object 30 along a connecting line between the unmanned aerial vehicle 10 and the target object 30, the nose direction of the unmanned aerial vehicle 10 may or may not be toward the target object 30. The photographing device 101 mounted on the unmanned aerial vehicle 10 may face the target object 30 so that the target object 30 can be kept in the shooting frame. As shown in FIG. 11, the flight controller 104 may adjust the photographing device 101 to a direction towards the target object 30 by adjusting the orientation of the supporting device 102 (for example, a gimbal).

In some embodiments, a connecting line of the movable platform and the target object is a connecting line between the movable platform and the target object in a horizontal direction. In other embodiments, a connecting line of the movable platform and the target object is a connecting line between a center point of the movable platform and a center point of the target object. As shown in FIG. 10, a connecting line between the unmanned aerial vehicle 10 and the target object 30 may be a connecting line 121 of the unmanned aerial vehicle 10 and the target object 30 in a horizontal direction or may be a connecting line 122 between a center point of the unmanned aerial vehicle 10 and a center point of the target object 30.

By controlling the movable platform to move away from or close to the target object based on the connecting line of the movable platform and the target object, it makes the user more intuitively feel the relationship between the operation of the user on the control device and the movable platform moving away from or approaching the target object, thereby saving the user time and effort to control the size of the target object in the shooting image. It makes the user clearly know how to control the control device to take a better picture, especially when the target object is in motion, which greatly reduces the difficulty of controlling the movable platform by the user through the control device.

In some embodiments, the controlling the movable platform to move relative to the target object may include controlling the movable platform to move in a direction perpendicular to a connecting line between the movable platform and the target object.

For example, when the user pushes the right joystick as shown in FIG. 1 to the left or right, the control device 11 may generate a control amount. Then, the control device 11 sends the control amount to the unmanned aerial vehicle 10, and the flight controller 104 maps the control amount to the polar coordinate system as described above to convert the control amount into a control instruction of the unmanned aerial vehicle. Further, the flight controller 104 controls the unmanned aerial vehicle 10 to move in a direction perpendicular to the connecting line of the unmanned aerial vehicle 10 and the target object 30 according to the control instruction. In other words, when the user pushes the right joystick as shown in FIG. 1 to the left or right, the unmanned aerial vehicle 10 can be controlled to fly with the target object 30 as the center.

Figure 12:
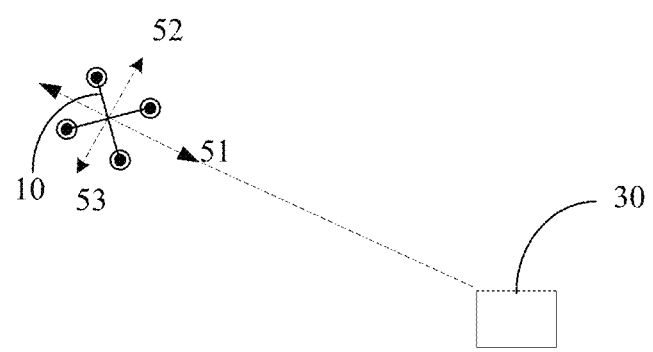
FIG. 12 illustrates a schematic diagram of a direction perpendicular to a connecting line between an unmanned aerial vehicle and a target object according to some embodiments of the present disclosure.

As shown in FIG. 12, 52 or 53 indicates a direction perpendicular to the connecting line of the unmanned aerial vehicle 10 and the target object 30. In certain embodiments, when the user pushes the right joystick as shown in FIG. 1 to the right, the flight controller 104 may control the unmanned aerial vehicle 10 to move in the direction of 53. When the user pushes the right joystick as shown in FIG. 1 to the left, the flight controller 104 may control the unmanned aerial vehicle 10 to move in the direction of 52.

In some embodiments, a direction vector corresponding to a direction perpendicular to a connecting line between the movable platform and the target object is parallel to a horizontal plane. For example, as shown in FIG. 12, the connecting line 51 between the unmanned aerial vehicle 10 and the target object 30, and the direction 52 or the direction 53 perpendicular to the connecting line 51 between the unmanned aerial vehicle 10 and the target object 30 are all in a plane parallel to the horizontal plane.

Figure 13:
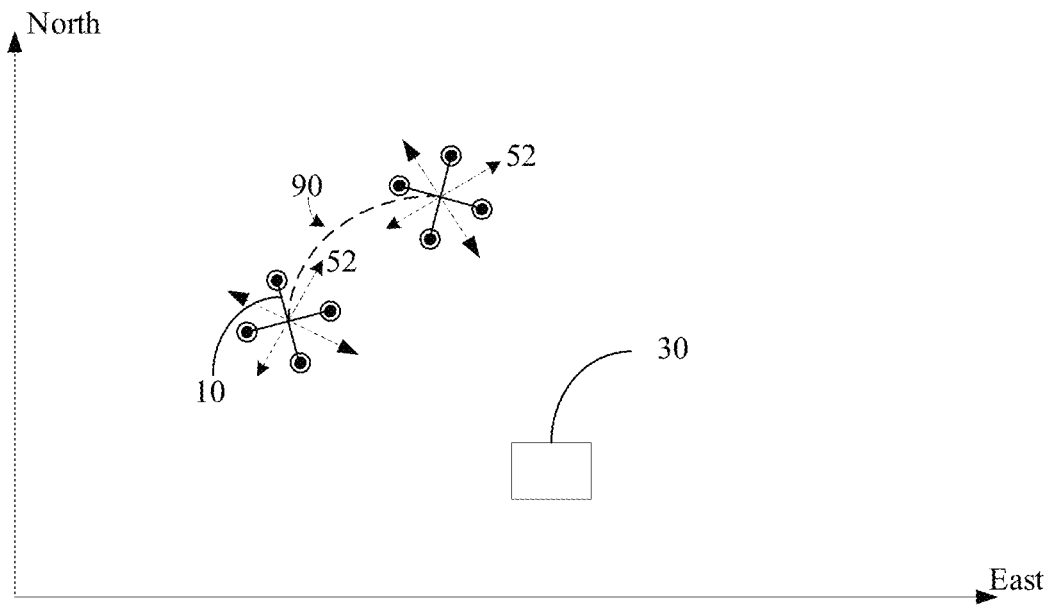
FIG. 13 illustrates a schematic diagram of a flight trajectory of an unmanned aerial vehicle according to some embodiments of the present disclosure.

For example, when the unmanned aerial vehicle moves in the direction 52 perpendicular to the connecting line between the unmanned aerial vehicle 10 and the target object 30, the flight trajectory of the unmanned aerial vehicle may be an arc centered on the target object 30, such as the arc 90 shown in FIG. 13. In some other embodiments, when a control amount for controlling the ascent of the unmanned aerial vehicle is superimposed, the unmanned aerial vehicle may perform a circular ascent flight relative to the target object 30 with the target object 30 as a center.

It is understandable that the connecting line of the movable platform and the target object may be specifically as shown in FIG. 10 and will not be repeated herein.

In other embodiments, the control device 11 may map the control amount to the polar coordinate system as described above to convert the control amount into a control command of the unmanned aerial vehicle. Then, the control device 11 sends the control instruction to the unmanned aerial vehicle 10.

By controlling the movable platform to move in a direction perpendicular to the connecting line between the movable platform and the target object, the user may more intuitively feel the corresponding relationship of the operation of the user on the control device and the rotation direction of the movable platform with the target object as the center, thereby saving the user time and effort to control the shooting angle of the target object, so that the user may explicitly know how to control the control device to shoot a better picture, especially when the target object is a moving object. It greatly reduces the difficulty of controlling the movable platform by the user through the control device.

In some embodiments, the controlling the movable platform to move relative to the target object may include controlling the movable platform to move in a yaw direction with a connecting line between the movable platform and the target object as a reference.

For example, when the user pushes the left joystick as shown in FIG. 1 to the left or right, the control device 11 may generate a control amount. Then, the control device 11 sends the control amount to the unmanned aerial vehicle 10, and the flight controller 104 maps the control amount to the polar coordinate system as described above to convert the control amount into a control command of the unmanned aerial vehicle. Further, the flight controller 104 controls the unmanned aerial vehicle 10 to move in a yaw direction based on a connecting line of the unmanned aerial vehicle 10 and the target object 30 according to the control instruction, so that the target object 30 shifts left or right in the shooting image, that is, to control the target object 30 to be at the left or right composition positions in the shooting image. For example, when the user pushes the left joystick as shown in FIG. 1 to the left, the unmanned aerial vehicle 10 uses the connecting line between the unmanned aerial vehicle 10 and the target object 30 as a reference and moves to the left side of the reference in the yaw direction. When the user pushes the left joystick as shown in FIG. 1 to the right, the unmanned aerial vehicle 10 uses the connecting line between the unmanned aerial vehicle 10 and the target object 30 as a reference and moves to the right side of the reference in the yaw direction. In other words, the user pushes the left joystick as shown in FIG. 1 to the left or right to control the left or right composition positions of the target object 30 in the shooting image.

In addition, when the user pushes the left joystick as shown in FIG. 1 upwards or downwards, the control device 11 may generate a control amount, and then, the control device 11 sends the control amount to the unmanned aerial vehicle 10, and the flight controller 104 maps the control amount to the polar coordinate system as described above to convert the control amount into a control command of the unmanned aerial vehicle. Further, the flight controller 104 controls the unmanned aerial vehicle 10 to ascend or descend according to the control instruction. For example, when the user pushes the left joystick as shown in FIG. 1 upwards, the unmanned aerial vehicle 10 ascends; when the user pushes the left joystick as shown in FIG. 1 downwards, the unmanned aerial vehicle 10 descends. In other words, the user can control the flight height of the unmanned aerial vehicle 10 by pushing the left joystick as shown in FIG. 1 upwards or downwards.

It is understandable that the connecting line between the movable platform and the target object may be specifically as shown in FIG. 10 and will not be repeated herein.

In other embodiments, the control device 11 may map the control amount to the polar coordinate system as described above to convert the control amount into a control instruction of the unmanned aerial vehicle. Further, the control device 11 sends the control instruction to the unmanned aerial vehicle 10.

By controlling the movable platform to move in the yaw direction with the connecting line between the movable platform and the target object as a reference, the user may more intuitively feel the corresponding relationship of the operation of the user on the control device and the yaw direction of the movable platform based on the connecting line of the movable platform and the target object, thereby saving the user time and effort to control the position of the target object in the left and right compositions of the shooting image, so that the user may explicitly know how to control the control device to get a better picture, especially when the target object is a moving object. It greatly reduces the difficulty of controlling the movable platform by the user through the control device.

Obviously, the corresponding relationship between the control mode of the unmanned aerial vehicle and the joystick is not limited to the above embodiments, and those skilled in the art may set the corresponding relationship between the control mode of the unmanned aerial vehicle and the joystick according to actual situations. In addition, the control of the movable platform described above can be combined with each other. For example, the movable platform may move in a yaw direction while approaching the target object. For another example, the movable platform may ascend or descend while moving around the target object, and details will not be described herein for conciseness.

One embodiment of the present disclosure further provides a control method for controlling a movable platform. In some embodiments, when the movable platform is in a first sub-mode, the control method shown in FIG. 4 is executed, and the operating mode of the movable platform may further include a second sub-mode or a third sub-mode for the target object.

In certain embodiments, the operating mode of the unmanned aerial vehicle may include a free mode, a following mode, and a surrounding mode. The free mode may specifically be the first sub-mode, the surrounding mode may specifically be the second sub-mode, and the following mode may specifically be the third sub-mode. For example, in the first sub-mode, a user may control the unmanned aerial vehicle through a joystick as described above. In one embodiment, when the unmanned aerial vehicle is in the first sub-mode, the unmanned aerial vehicle also has a detour function for the obstacle.

It is understandable that when the unmanned aerial vehicle is in the first sub-mode, the user may control the unmanned aerial vehicle to move relative to the target object by taking the connecting line between the unmanned aerial vehicle and the target object as a reference through the joystick as described above. When the unmanned aerial vehicle exits the first sub-mode, the user may also control the unmanned aerial vehicle to move based on the nose direction of the unmanned aerial vehicle or a certain fixed direction through the joystick as described above. In other words, the joystick may be multiplexed in the first sub-mode and the non-first sub-mode, which not only saves the number of joysticks on the control device, but also improves the flexibility of the joystick on the control device.

In some embodiments, the second sub-mode is used to control the movable platform to automatically surround the target object, and the third sub-mode is used to control the movable platform to automatically follow the target object.

For example, when the unmanned aerial vehicle is in the second sub-mode, the unmanned aerial vehicle may automatically surround the target object, so that the photographing device may perform surround shooting of the target object. When the unmanned aerial vehicle is in the third sub-mode, the unmanned aerial vehicle may automatically maintain the relative position between the unmanned aerial vehicle and the target object according to the target object selected by the user, and then follow the target object.

In some embodiments, the control method may further include: when the movable platform enters any one of the first sub-mode, the second sub-mode, or the third sub-mode, adjusting the photographing device of the movable platform to a direction towards the target object.

For example, when the unmanned aerial vehicle enters any one of the first sub-mode, the second sub-mode, or the third sub-mode, the unmanned aerial vehicle may adjust the photographing device mounted on the gimbal to the direction of the target object. In this way, when the user subsequently operates the joystick or calls the automatic control program, it can be ensured that the target object appears in the picture.

In some embodiments, the adjusting the photographing device of the movable platform to a direction towards the target object may include: adjusting the photographing device to a direction towards the target object by adjusting an orientation of the movable platform; or adjusting the photographing device to a direction towards the target object by adjusting an orientation of a gimbal of the movable platform, the photographing device being mounted on the gimbal.

For example, there are several possible implementations for the unmanned aerial vehicle to adjust the photographing device mounted on the gimbal to the direction towards the target object: One feasible implementation manner is to adjust the orientation of the unmanned aerial vehicle to adjust the photographing device to the direction toward the target object, where the orientation of the unmanned aerial vehicle may be the nose direction of the unmanned aerial vehicle. Another feasible implementation manner is to adjust the orientation of the gimbal to adjust the photographing device to the direction towards the target object.

One embodiment of the present disclosure further provides a control method for controlling a movable platform.

Figure 14:
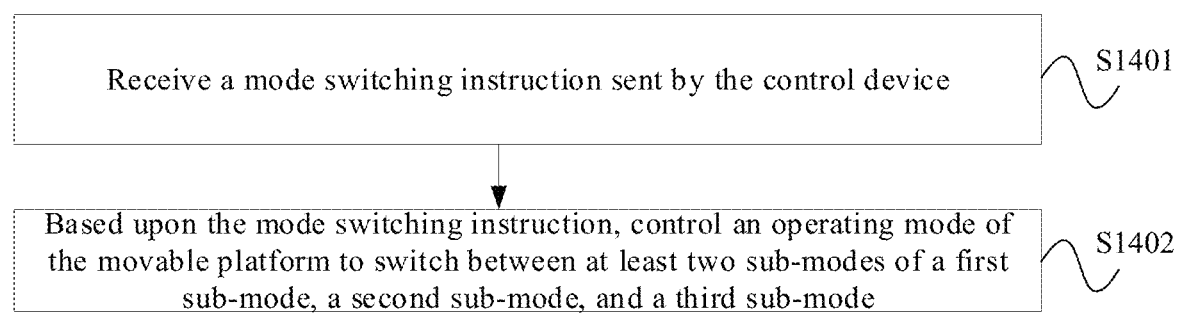
FIG. 14 illustrates a flowchart of a movable platform control method according to some embodiments of the present disclosure.

On the basis of the above embodiments, as shown in FIG. 14, the control method may further include step S1401 and step S1402.

Step S1401 may include receiving a mode switching instruction sent by the control device.

For example, the control device 11 may be provided with a mode switch key or button, and the mode switch key or button may be an icon, or a virtual key displayed on a screen of the control device 11 or may be a physical key or button provided on the body of the control device 11. When the user operates the mode switch key or button, the control device can generate a mode switching instruction and send the mode switching instruction to the unmanned aerial vehicle 10.

Step S1402 may include, based upon the mode switching instruction, controlling an operating mode of the movable platform to switch between at least two sub-modes of a first sub-mode, a second sub-mode, and a third sub-mode.

The unmanned aerial vehicle 10 may control the operating mode of the unmanned aerial vehicle to switch between at least two sub-modes of the first sub-mode, the second sub-mode and the third sub-mode based upon the mode switching instruction. For example, the current operating mode of the unmanned aerial vehicle is the first sub-mode. When the user operates the mode switch key or button on the control device 11, the control device 11 can control the unmanned aerial vehicle to switch the current operating mode to the second sub-mode.

In some embodiments, the operating mode of the movable platform may include an intelligent eye mode, and the intelligent eye mode may include a first sub-mode, a second sub-mode, and a third sub-mode.

Figure 15:
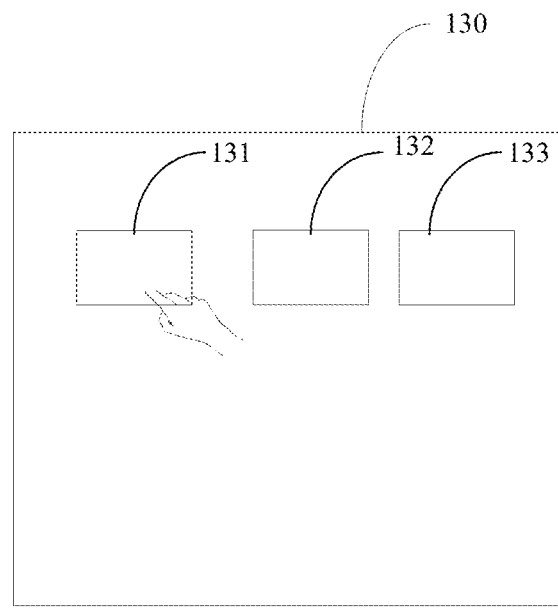
FIG. 15 illustrates a schematic diagram of an intelligent eye mode interface according to some embodiments of the present disclosure.

For example, the operating mode of the unmanned aerial vehicle may include an intelligent eye mode, and the intelligent eye mode may include a first sub-mode, a second sub-mode, and a third sub-mode as described above. That is to say, the first sub-mode, the second sub-mode, and the third sub-mode may be unified under the intelligent eye mode, and the intelligent eye mode may be used as a unified entry for the first sub-mode, the second sub-mode, and the third sub-mode. As shown in FIG. 15, 130 represents an intelligent eye mode interface displayed by the control device 11. The intelligent eye mode interface may include three icons, which are respectively denoted as icon 131, an icon 132, and an icon 133. The user may click on icon 131 to make the unmanned aerial vehicle operate in the first sub-mode, the user may click on icon 132 to make the unmanned aerial vehicle operate in the second sub-mode, and the user may click on icon 133 to make the unmanned aerial vehicle operate in the third sub-mode.

By unifying the first sub-mode, the second sub-mode, and the third sub-mode in the intelligent eye mode, the three sub-modes can be seamlessly switched, that is to say, it is convenient for the user to switch the operating mode of the unmanned aerial vehicle.

In some embodiments, when the operating mode of the movable platform is switched between at least two of the first sub-mode, the second sub-mode, and the third sub-mode, the target object remains unchanged.

For example, when the unmanned aerial vehicle is operating in the first sub-mode, the user may select a target object through the method described above. When the operating mode of the unmanned aerial vehicle is switched from the first sub-mode to the second sub-mode, the target object remains as the target object in the first sub-mode. In other words, when the operating mode of the unmanned aerial vehicle changes, the user does not need to re-select a new target object, which may ensure a smoother picture.

One embodiment of the present disclosure further provides a control method for controlling a movable platform. On the basis of the above embodiments, the control method may further include, when the movable platform moves relative to the target object, receiving a locking instruction sent by the control device, where the locking instruction is used to lock the control amount of the movable platform.

For example, the control device 11 may be provided with a locking key or button, and the locking key or button may be an icon, or a virtual key displayed on a screen of the control device 11 or may be a physical key or button provided on the body of the control device 11. When a user operates the locking key or button, the control device may generate a locking instruction. Optionally, when the unmanned aerial vehicle is moving relative to the target object based on the connecting line between the unmanned aerial vehicle and the target object, if the user operates the locking key or button, the unmanned aerial vehicle can receive the locking instruction sent by the control device. Further, the unmanned aerial vehicle or the control device may lock the control amount of the unmanned aerial vehicle according to the locking instruction. Thus, the flight controller 104 may control the unmanned aerial vehicle to fly according to the locked control amount. For example, the flight controller 104 may control the unmanned aerial vehicle to fly at a fixed velocity or acceleration according to the locked control amount. The velocity may be a linear velocity or an angular velocity, and the acceleration may be a linear acceleration or an angular acceleration.

In addition, on the basis of the above embodiments, the target object is not limited to a moving object. For example, it may also be a stationary object, or the target object may be a target point determined according to a positioning system of the unmanned aerial vehicle. In addition, when identifying the target object, the present disclosure does not limit a specific recognition algorithm. For example, when a moving object is recognized, a machine learning algorithm may be used; when a stationary object is recognized, a visual ranging algorithm may be used.

Figure 16:
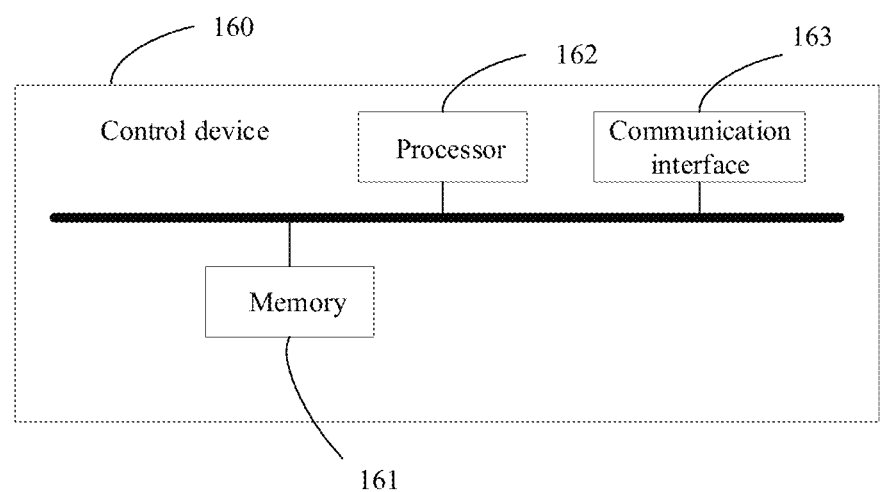
FIG. 16 illustrates a structural diagram of a movable platform control device according to some embodiments of the present disclosure.

One embodiment of the present disclosure further provides a control device for a movable platform. The control device may be a control device in the movable platform, such as a flight controller. The control device may be a control device as described above, or a module in the control device. The movable platform is communicatively connected with the control device of the movable platform. FIG. 16 illustrates a structural diagram of a movable platform control device according to some embodiments of the present disclosure. As shown in FIG. 16, the control device 160 may include a memory 161 and a processor 162. The memory 161 is configured to store program codes, and the processor 162 calls the program codes and, when the program codes are executed, is configured to: acquire a control amount used to control the movable platform, where the control amount is generated based upon an operation of a user on the control device; convert the control amount into a control instruction of the movable platform based upon a position of the movable platform and a position of a target object photographed by the movable platform; and control the movable platform to move relative to the target object according to the control instruction.

In some embodiments, when the processor 162 is configured to convert the control amount into the control instruction of the movable platform based upon the position of the movable platform and the position of the target object photographed by the movable platform, the processor 162 is specifically configured to: establish a coordinate system based upon the position of the movable platform and the position of the target object; and map the control amount to the coordinate system to convert the control amount into the control instruction of the movable platform.

In certain embodiments, the coordinate system is a polar coordinate system, and the pole of the polar coordinate system is determined according to the position of the movable platform, and the polar axis direction of the polar coordinate system is a connecting line direction between the movable platform and the target object. A connecting line between the movable platform and the target object is a connecting line between the movable platform and the target object in a horizontal direction or a connecting line between a center point of the movable platform and a center point of the target object.

In some embodiments, when the processor 162 is configured to control the movable platform to move relative to the target object, the processor 162 is specifically configured to control the movable platform to move away from or approach the target object along a connecting line between the movable platform and the target object.

In some embodiments, when the processor 162 is configured to control the movable platform to move relative to the target object, the processor 162 is specifically configured to control the movable platform to move in a direction perpendicular to a connecting line between the movable platform and the target object.

In some embodiments, a direction vector corresponding to the direction perpendicular to the connecting line between the movable platform and the target object is parallel to a horizontal plane.

In some embodiments, when the processor 162 is configured to control the movable platform to move relative to the target object, the processor 162 is specifically configured to control the movable platform to move in a yaw direction with a connecting line between the movable platform and the target object as a reference.

In some embodiments, a connecting line between the movable platform and the target object is a connecting line between the movable platform and the target object in a horizontal direction or a connecting line between a center point of the movable platform and a center point of the target object.

In some embodiments, when the movable platform is in a first sub-mode, the control method according to the first aspect of the present disclosure is executed, and the operating mode of the movable platform further includes a second sub-mode or a third sub-mode for the target object.

In some embodiments, the second sub-mode is used to control the movable platform to automatically surround the target object, and the third sub-mode is used to control the movable platform to automatically follow the target object.

In some embodiments, the processor 162 is further configured to adjust a photographing device of the movable platform to a direction towards the target object when the movable platform enters any one of the first sub-mode, the second sub-mode, or the third sub-mode.

In some embodiments, when the processor 162 is configured to adjust the photographing device of the movable platform to the direction towards the target object, the processor 162 is specifically configured to adjust the photographing device to the direction towards the target object by adjusting an orientation of the movable platform; or adjust the photographing device to the direction towards the target object by adjusting an orientation of a gimbal of the movable platform, the photographing device being mounted on the gimbal.

In some embodiments, the control device may further include a communication interface 163; the processor 162 is further configured to: receive a mode switching instruction sent by the control device through the communication interface 163; and control the operating mode of the movable platform to switch between at least two sub-modes of the first sub-mode, the second sub-mode and the third sub-mode according to the mode switching instruction.

In some embodiments, the operating mode of the movable platform may include an intelligent eye mode, and the intelligent eye mode may include the first sub-mode, the second sub-mode, and the third sub-mode.

In some embodiments, when the operating mode of the movable platform is switched between at least two of the first sub-mode, the second sub-mode, and the third sub-mode, the target object remains unchanged.

In some embodiments, the processor 162 is further configured to, when the movable platform moves relative to the target object, receive a locking instruction sent by the control device through the communication interface 163, where the locking instruction is used to lock the control amount of the movable platform.

In some embodiments, the operation may include an operation of a joystick, a dial wheel, or a key of the control device.

In some embodiments, the processor 162 is further configured to determine the target object according to a click operation, a frame selection operation, or a position input operation of a user on a user interface of the control device.

The specific principle and implementation modes of the control device provided in the embodiments of the present disclosure are similar to those in the method embodiments disclosed above, for parts that are not described in detail in the instance device, please refer to the relevant description of the method embodiments, which will be repeated herein for conciseness.

One embodiment of the present disclosure further provides a movable platform. The movable platform may include a body, a power system, and the control device as described above, wherein the power system is installed on the body to provide power for movement, and the control device may be used to implement the technical schemes of the above method embodiments. The implementation principle and technical effects of the control device are similar to those in the method embodiments disclosed above and will not be repeated herein for conciseness. In some embodiments, the movable platform may include an unmanned aerial vehicle.

In addition, in one embodiment, the present disclosure also provides a computer-readable storage medium on which a computer program is stored, and the computer program is executed by a processor to implement the control method of the movable platform described in the foregoing embodiments.

The computer-readable storage medium may be an internal storage unit of the control device and the movable platform described in any of the foregoing embodiments, such as a hard disk or a memory of the control device and the movable platform. The computer-readable storage medium may also be an external storage device of the control device and the movable platform, such as a plug-in hard disk, a smart media card (SMC), and a secure digital (SD) card, a flash card, etc., equipped on the control device and the movable platform.

The computer readable storage medium may be a tangible device that can store programs and instructions for use by an instruction execution device (processor). The computer readable storage medium may be, for example, but is not limited to, an electronic storage device, a magnetic storage device, an optical storage device, an electromagnetic storage device, a semiconductor storage device, or any appropriate combination of these devices. A non-exhaustive list of more specific examples of the computer readable storage medium includes each of the following (and appropriate combinations): flexible disk, hard disk, solid-state drive (SSD), random access memory (RAM), read-only memory (ROM), erasable programmable read-only memory (EPROM or Flash), static random access memory (SRAM), compact disc (CD or CD-ROM), digital versatile disk (DVD) and memory card or stick. A computer readable storage medium, as used in this disclosure, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The computer program, program instructions and/or program codes described in this disclosure can be downloaded to an appropriate computing or processing device from a computer readable storage medium or to an external computer or external storage device via a global network (i.e., the Internet), a local area network, a wide area network and/or a wireless network. The network may include copper transmission wires, optical communication fibers, wireless transmission, routers, firewalls, switches, gateway computers and/or edge servers. A network adapter card or network interface in each computing or processing device may receive computer readable program instructions from the network and forward the computer program/program instructions/program codes for storage in a computer readable storage medium within the computing or processing device.

The computer program, program instructions and/or program codes for carrying out operations of the present disclosure may include machine language instructions and/or microcode, which may be compiled or interpreted from source code written in any combination of one or more programming languages, including assembly language, Basic, Fortran, Java, Python, R, C, C++, C#, or similar programming languages. the computer program/program instructions/program codes may execute entirely on a user's personal computer, notebook computer, tablet, or smartphone, entirely on a remote computer or computer server, or any combination of these computing devices. The remote computer or computer server may be connected to the user's device or devices through a computer network, including a local area network or a wide area network, or a global network (i.e., the Internet). In some embodiments, electronic circuitry including, for example, programmable logic circuitry, field-programmable gate arrays (FPGA), or programmable logic arrays (PLA) may execute the computer program/program instructions/program codes by using information from the computer program/program instructions/program codes to configure or customize the electronic circuitry, in order to perform aspects of the present disclosure.

The computer program, program instructions and/or program codes that may implement the device/systems and methods described in this disclosure may be provided to one or more processors (and/or one or more cores within a processor) of a general purpose computer, special purpose computer, or other programmable apparatus to produce a machine, such that the instructions, which execute via the processor of the computer or other programmable apparatus, create a system for implementing the functions specified in the flow diagrams and block diagrams in the present disclosure. The computer program/program instructions/program codes may also be stored in a computer readable storage medium that can direct a computer, a programmable apparatus, and/or other devices to function in a particular manner, such that the computer readable storage medium having stored instructions is an article of manufacture including instructions which implement aspects of the functions specified in the flow diagrams and block diagrams in the present disclosure.

The computer program, program instructions and/or program codes may also be loaded onto a computer, other programmable apparatus, or other device to cause a series of operational steps to be performed on the computer, other programmable apparatus or other device to produce a computer implemented process, such that the instructions which execute on the computer, other programmable apparatus, or other device implement the functions specified in the flow diagrams and block diagrams in the present disclosure.

Aspects of the present disclosure are described herein with reference to flow diagrams and block diagrams of methods, apparatus (systems), and computer program products according to embodiments of the disclosure. It will be understood by those skilled in the art that each block of the flow diagrams and block diagrams, and combinations of blocks in the flow diagrams and block diagrams, can be implemented by computer readable program instructions.

The processor may be one or more single or multi-chip microprocessors or circuitry, such as those designed and/or manufactured by Intel Corporation, Advanced Micro Devices, Inc. (AMD), Arm Holdings (Arm), Apple Computer, etc. Examples of microprocessors include Celeron, Pentium, Core i3, Core i5 and Core i7 from Intel Corporation; Opteron, Phenom, Athlon, Turion and Ryzen from AMD; and Cortex-A, Cortex-R and Cortex-M from Arm.

The memory and non-volatile storage medium may be computer-readable storage media. The memory may include any suitable volatile storage devices such as dynamic random access memory (DRAM) and static random access memory (SRAM). The non-volatile storage medium may include one or more of the following: flexible disk, hard disk, solid-state drive (SSD), read-only memory (ROM), erasable programmable read-only memory (EPROM or Flash), compact disc (CD or CD-ROM), digital versatile disk (DVD) and memory card or stick.

The program may be a collection of machine readable instructions and/or data that is stored in non-volatile storage medium and is used to create, manage, and control certain software functions that are discussed in detail elsewhere in the present disclosure and illustrated in the drawings. In some embodiments, the memory may be considerably faster than the non-volatile storage medium. In such embodiments, the program may be transferred from the non-volatile storage medium to the memory prior to execution by a processor.

Each part of the present disclosure may be implemented by hardware, software, firmware, or a combination thereof. In the above exemplary embodiments, multiple steps or methods may be implemented by hardware or software stored in a memory and executed by a suitable instruction execution system.

It is understandable that the disclosed device and method may be implemented in other manners. For example, the device embodiments described above are merely schematic, the division of the units and modules is merely a logical function division, and in actual implementation, there may be another division manner, for example, multiple units, modules, or components may be combined or integrated into another system, or some features may be ignored or not performed. In addition, the displayed or discussed mutual coupling or direct coupling or communication connection can be indirect coupling or communication connection through some interfaces, devices, or units, and can be in electrical, mechanical, or other forms.

The units and modules described as separate parts may or may not be physically separate, and parts displayed as units/modules may or may not be physical units, that is, may be located in one place, or may be distributed on a plurality of network units. Some or all of the units/modules can be selected according to actual requirements to achieve the purpose of the scheme of the embodiment. In addition, functional units in the embodiments of the present disclosure may be integrated into one processing unit, or each of the units may exist alone physically, or two or more units may be integrated into one unit. The integrated unit may be realized in the form of hardware and may also be realized in the form of a hardware plus software functional unit.

Unless otherwise defined, all technical and scientific terms used herein have the same meaning as commonly understood by those skilled in the technical field of the present disclosure. The terms used herein are only for the purpose of describing specific embodiments and are not intended to limit of the disclosure. As used in this disclosure and the appended claims, the singular forms "a," "an," and "the" are intended to include the plural forms as well, unless the context clearly indicates otherwise. It should also be understood that the term "and/or" as used herein refers to and encompasses any or all possible combinations of one or more associated listed items. Terms such as "connected" or "linked" are not limited to physical or mechanical connections, and may include electrical connections, whether direct or indirect.

It should be noted that in the instant disclosure, relational terms such as "first" and "second", etc. are used herein merely to distinguish one entity or operation from another entity or operation without necessarily requiring or implying any such actual relationship or order between such entities or operations. The terms "comprise/comprising", "include/including", "has/have/having" or any other variants thereof are intended to cover non-exclusive inclusion, so that a process, method, article, or device that includes a series of elements includes not only those elements, but also other elements that are not explicitly listed, or also includes elements inherent to such processes, methods, articles, or equipment. If there are no more restrictions, the element defined by the phrase, such as "comprising a . . . ", "including a . . . " does not exclude the presence of additional identical elements in the process, method, article, or equipment that includes the element.

Finally, it should be noted that the above embodiments/examples are only used to illustrate the technical features of the present disclosure, not to limit them; although the present disclosure has been described in detail with reference to the foregoing embodiments and examples, those of ordinary skill in the art should understand that: the technical features disclosed in the foregoing embodiments and examples can still be modified, some or all of the technical features can be equivalently replaced, but, these modifications or replacements do not deviate from the spirit and scope of the disclosure.

What is claimed is:

1. A control method for controlling a movable platform, the movable platform being communicatively connected with a control device of the movable platform, and the control method comprising:
acquiring a control amount for controlling the movable platform, the control amount being generated based upon an operation of a user on the control device;
converting the control amount into control instruction of the movable platform based upon a position of the movable platform and a position of a target object photographed by the movable platform; and
controlling the movable platform to move relative to the target object according to the control instruction, wherein the controlling the movable platform to move relative to the target object comprises controlling the movable platform to move in a yaw direction with a connecting line between the movable platform and the target object as a reference.

2. The control method according to claim 1, wherein the converting the control amount into the control instruction of the movable platform based upon the position of the movable platform and the position of the target object photographed by the movable platform comprises:
establishing a coordinate system based upon the position of the movable platform and the position of the target object; and
mapping the control amount to the coordinate system to convert the control amount into the control instruction of the movable platform.

3. The control method according to claim 2, wherein the coordinate system is a polar coordinate system, a pole of the polar coordinate system is determined according to the position of the movable platform, and a polar axis direction of the polar coordinate system is a direction of the connecting line of the movable platform and the target object; and wherein the connecting line between the movable platform and the target object is a connecting line between the movable platform and the target object in a horizontal direction or a connecting line between a center point of the movable platform and a center point of the target object.

4. The control method according to claim 1, wherein the connecting line between the movable platform and the target object is a connecting line between the movable platform and the target object in a horizontal direction or a connecting line between a center point of the movable platform and a center point of the target object.

5. The control method according to claim 4, wherein the controlling the movable platform to move relative to the target object comprises controlling the movable platform to move away from or approach the target object along the connecting line between the movable platform and the target object.

6. The control method according to claim 4, wherein the controlling the movable platform to move relative to the target object comprises controlling the movable platform to move in a direction perpendicular to the connecting line between the movable platform and the target object.

7. The control method according to claim 6, wherein a direction vector corresponding to the direction perpendicular to the connecting line between the movable platform and the target object is parallel to a horizontal plane.

8. The control method according to claim 1, wherein an operating mode of the movable platform comprises a first sub-mode, a second sub-mode, or a third sub-mode; and when the movable platform is in the first sub-mode, the movable platform is controlled to move relative to the target object based on the connecting line between the movable platform and the target object.

9. The control method according to claim 8, wherein the second sub-mode is used to control the movable platform to automatically surround the target object, and the third sub-mode is used to control the movable platform to automatically follow the target object.

10. The control method according to claim 8, further comprising: when the movable platform enters one of the first sub-mode, the second sub-mode, or the third sub-mode, adjusting a photographing device of the movable platform to a direction toward the target object.

11. The control method according to claim 10, wherein the adjusting the photographing device of the movable platform to the direction toward the target object comprises:
adjusting the photographing device to the direction toward the target object by adjusting an orientation of the movable platform; or
adjusting the photographing device to the direction toward the target object by adjusting an orientation of a gimbal of the movable platform, wherein the photographing device is mounted on the gimbal.

12. The control method according to claim 8, further comprising:
receiving a mode switching instruction sent by the control device; and
controlling the operating mode of the movable platform to switch between at least two sub-modes of the first sub-mode, the second sub-mode and the third sub-mode according to the mode switching instruction.

13. The control method according to claim 12, wherein the operating mode of the movable platform comprises an intelligent eye mode comprising the first sub-mode, the second sub-mode, and the third sub-mode.

14. The control method according to claim 12, wherein the operating mode of the movable platform is switched between at least two of the first sub-mode, the second sub-mode and the third sub-mode while the target object remains unchanged.

15. The control method according to claim 1, further comprising: when the movable platform moves relative to the target object, receiving a locking instruction sent by the control device, wherein the locking instruction is configured to lock the control amount of the movable platform.

16. The control method according to claim 1, wherein the operation comprises an operation of a joystick, a dial wheel, or a key of the control device.

17. The control method according to claim 1, wherein the movable platform is controlled to move in the yaw direction to adjust a composition position of the target object in a shooting image.

18. The control method according to claim 1, further comprising:
controlling an operating mode of the movable platform to switch between at least two sub-modes, the operating mode comprising the at least two sub-modes, wherein when the operating mode of the movable platform is in either of the at least two sub-modes, the movable platform is controlled to move relative to the target object, and wherein the operating mode of the movable platform is switched between the at least two sub-modes while the target object remains unchanged.

19. A control device of a movable platform, wherein the movable platform is communicatively connected with the control device of the movable platform, and the control device comprises one or more processors and one or more memories, the one or more memories are configured to store computer program instructions, the one or more processors are configured to enable the control device to perform at least the following operations:

acquiring a control amount for controlling the movable platform, wherein the control amount is generated based upon an operation of a user on the control device;

converting the control amount into control instruction of the movable platform based upon a position of the movable platform and a position of a target object photographed by the movable platform; and controlling the movable platform to move relative to the target object according to the control instruction, wherein the controlling the movable platform to move relative to the target object comprises controlling the movable platform to move in a yaw direction with a connecting line between the movable platform and the target object as a reference.

20. A control system of a movable platform, the control system comprising a movable platform and a control device, wherein the movable platform is communicatively connected with the control device, and the movable platform comprises one or more processors configured to:

acquire a control amount for controlling the movable platform, the control amount being generated based upon an operation of a user on the control device;

convert the control amount into control instruction of the movable platform based upon a position of the movable platform and a position of a target object photographed by the movable platform; and control the movable platform to move relative to the target object according to the control instruction, wherein the controlling the movable platform to move relative to the target object comprises controlling the movable platform to move in a yaw direction with a connecting line between the movable platform and the target object as a reference.

* * * * *